United States Patent [19]

Nelson

[11] Patent Number: 4,956,909
[45] Date of Patent: Sep. 18, 1990

[54] METHOD OF MAKING SPACED-WALL APPLIANCE WITH A SEALING AND INSULATING DEVICE BETWEEN SAID WALLS

[75] Inventor: Thomas E. Nelson, Anchorage, Ky.

[73] Assignee: Soltech, Inc., Shelbyville, Ky.

[21] Appl. No.: 376,138

[22] Filed: Jun. 30, 1989

Related U.S. Application Data

[63] Continuation of Ser. No. 216,384, Jul. 7, 1988, Pat. No. 4,875,272.

[51] Int. Cl.$^5$ .................. B23P 11/02; B23P 19/04; B21D 39/00
[52] U.S. Cl. .................................. 29/451; 29/455.1; 29/460; 126/376; 220/413; 277/228; 277/205
[58] Field of Search .................. 29/450, 451, 455.1; 264/46.5, 46.6, 46.9, 262; 126/376, 344, 373, 375; 220/417, 412, 459; 277/228, 205, 190

[56] References Cited

U.S. PATENT DOCUMENTS 4,798,308 1/1989 Nelson .................................. 220/445

Primary Examiner—Timothy V. Eley
Attorney, Agent, or Firm—Woodard, Emhardt, Naughton, Moriarty & McNett

[57] ABSTRACT

An appliance, such as a refrigerator or water heater construction, includes a first wall in surrounding spaced relationship to a second wall. An insulating and sealing device of insulation material, such as fiberglass or foamed material partially enclosed in an open-topped envelope of plastic or foil material is circumferentially located in the space between the first wall and outer wall at a preselected location within the space. The insulating and sealing device which is of a radial thickness greater than the radial width of the space is radially compressed between the first wall surface and second wall surface. An expanded foam thermal insulation material fills the space to one side of the insulating and sealing device. A method of making the appliance having two spaced apart walls includes the steps of positioning an insulating and sealing device of resilient, flexible insulation material on and in contact with one of the walls, the insulating and sealing device having a radial thickness greater than the radial width of the space, and positioning the two walls into transverse spaced apart relationship radially compressing the collar between the two walls. In another embodiment, the method of making the appliance includes the steps of positioning the two walls in transverse spaced apart relationship, and positioning an insulating and sealing device of resilient, flexible insulation material within the space in contact with the facing surfaces of the two walls, the insulating and sealing device having a radial thickness greater than the width of the space.

13 Claims, 3 Drawing Sheets

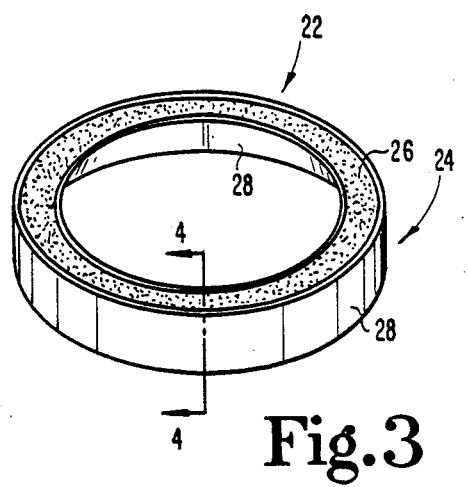
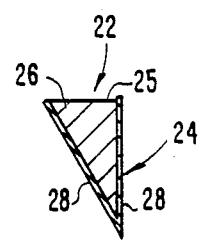
Fig.3   Fig.4
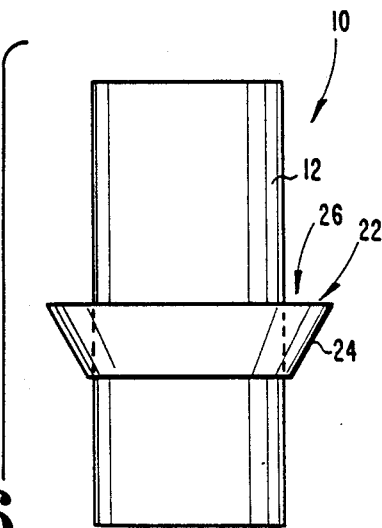
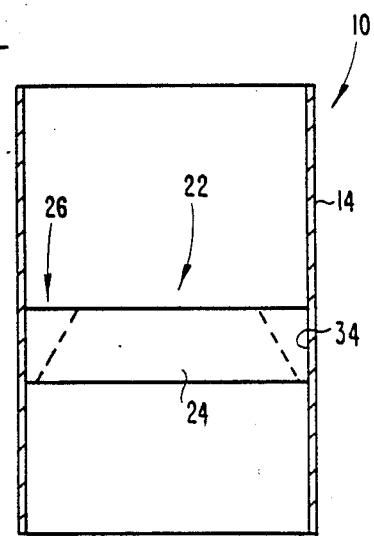
Fig.6   Fig.7
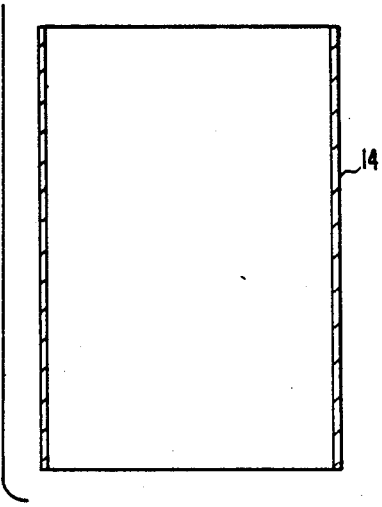
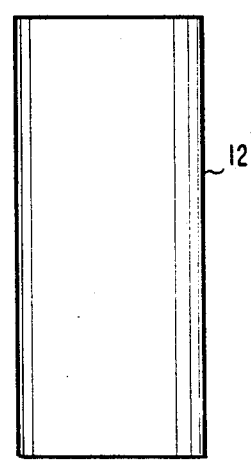

METHOD OF MAKING SPACED-WALL APPLIANCE WITH A SEALING AND INSULATING DEVICE BETWEEN SAID WALLS

This is a continuation of Ser. No. 216,384, filed July 7, 1988, now U.S. Pat. No. 4,875,272.

BACKGROUND OF THE INVENTION

The present invention relates to appliances and more particularly to a thermally insulated appliance construction, a sealing device therefor, and a method of manufacturing an appliance.

Typically, appliances are constructed of an wall with an outer wall located over the inner wall with a space therebetween. The space between the inner wall and outer wall is filled with a thermal insulation. For many years fiberglass has been used as the insulation material between the inner wall and outer wall. More recently, a foam such as urethane, has been used as the thermal insulation material in place of fiberglass between the inner wall and outer wall. Typically, foamable material is injected into the space between the inner wall and outer wall, and is allowed to foam in situ. However, there is a problem in restraining the expanding foam within the space and more particularly within a predetermined location or region within the space. This is important, for example, when using foam insulation in an appliance, such as for example, a gas-fired type water heater wherein it is extremely undesirable to have flammable foam in proximity to the gas burner of the water heater.

Various proposals have been made to construct appliances, such as water heaters.

U.S. Pat. No. 4,372,028 issued on Feb. 8, 1983 shows a water heater having a foam filled closed collar located in the annular space between the inner tank and outer shell at the bottom of the inner tank, and the annular space above the collar filled with expanded foam. The collar functions as a stop to the expanded foam in the annular space thereabove. This patent further shows a method of manufacturing the water heater which includes the steps of forming a flexible, expandable closed elongated bag having a hole therein through which an expandable foam can be injected into the bag. The bag is filled with a foam material which expands the bag to form a collar, but before the foam material has had sufficient time to fully expand, the bag opening is sealed and the bag is circumferentially wrapped around the lower end of the tank with the bag ends overlapping each other. Next, and still before the foam material in the collar has had sufficient time to expand, the outer shell is positioned over the inner tank and bag. The foam in the bag expands forming a collar which is in compression between the inner tank and outer shell. The annular space above the collar is then filled with expandable form material.

U.S. Pat. No. 4,447,377 issued on May 8, 1977 shows a gas-fired water heater wherein a layer of fiberglass insulation material is wrapped around the bottom portion of the inner water tank around the combustion chamber and a plastic envelope is wrapped around the inner tank above the fiberglass insulation. The envelope is in the form of an elongated thin tube having an inner wall, an outer wall, a bottom wall, two end walls and an open top. When wrapped around the inner tank, the end walls of the envelope abut each other. The outer shell is positioned over the inner tank such that the envelope is in the annular space therebetween. Expandable foam is injected through the open envelope top into the envelope and allowed to expand therein.

U.S. Pat. No. 4,477,399 issued on Oct. 16, 1984 shows a water heater having an inflatable toroidally shaped tube located around the bottom end of the inner tank such that when the toroidal tube is inflated with air, it seals the bottom end of the annular space between the inner tank and outer shell. A foamable material is then injected into the annular space above the toroidal tube to fill the annular space.

SUMMARY OF THE INVENTION

The present invention provides an appliance construction, a sealing device usable in the appliance construction, and method of manufacturing an appliance construction which provides for easy assembly.

More particularly, the present invention provides an appliance construction comprising a first wall, a second wall transversely spaced from the first wall defining a space therebetween, and an insulation and sealing device located in the space and in sealing contact with the facing wall surfaces of the first and second walls across the space therebetween, the sealing device having an open topped trough fabricated of flexible material, the width of the trough across the open top being at least equal to the width of the space between the first and second walls, and a resilient insulating material in the open topped trough exposed at the open top of the trough.

The present invention also provides an insulating and sealing device for use, for example, in an appliance construction for insulating and sealing across a space between two juxtaposed spaced apart walls of the appliance comprising an open topped trough fabricated of a flexible material, the width of the trough across the open top being at least approximately equal to and preferably greater than the width of the space between the two facing surfaces of the juxtaposed walls, and resilient insulating material disposed in the trough and exposed at the open top of the trough.

The present invention further provides a method for making an appliance having a first wall spaced from a second wall defining a space therebetween, comprising the steps of positioning an insulation and sealing device in contact with the first wall, the insulation and sealing device comprising an open topped trough fabricated of a flexible material, the width of the trough across the open top being at least equal to the width of the space between the first and second walls, and a resilient insulating material in the open topped trough exposed at the open top of the trough, and positioning the first wall and second wall into spaced apart juxtaposition such that the insulation and sealing device is in contact with the second wall creating a seal across the space between the first and second walls creating a compressive seal across the space.

BRIEF DESCRIPTION OF THE DRAWING

A better understanding of the present invention will be had upon reference to the following description in conjunction with the accompanying drawings in which like numerals refer to like parts throughout the several views and wherein:

FIG. 3 is an enlarged perspective view of another embodiment of an insulating and sealing device of the present invention;

FIG. 4 is a transverse cross-section view of the embodiment of FIG. 3 as seen in the direction of arrows 4—4 in FIG. 3;

FIG. 6 is a schematic representation, in transverse cross-section, of a step in the assembly of the water heater appliance of FIG. 4;

FIG. 7 is a schematic representation, in transverse cross-section, of an alternative step in the assembly of the water heater appliance of FIG. 1;

DETAILED DESCRIPTION OF THE PREFERRED EMBODIMENT

Figure 1:
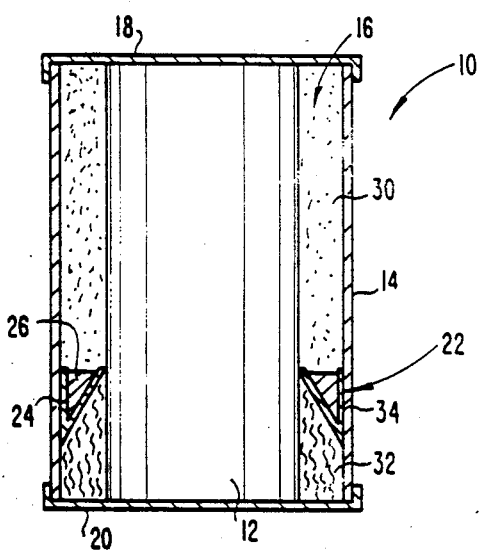
FIG. 1 is a schematic representation, in transverse cross-section, of a water heater appliance construction of the present invention.

FIG. 1 schematically illustrates an appliance such as a conventional type water heater construction, generally denoted as the numeral 10, having an inner water tank 12 for containing water and an outer shell 14 concentrically surrounding the inner water tank 12. The outer shell 14 and inner water tank 12 cooperate to define an annular space 16 therebetween. The water heater device 10 is also shown having a cap 18 and a floor 20 closing the top end and bottom end of the annular space 16, respectively.

With continued reference to FIGS. 1-4, an insulating and sealing device 22 is located in the annular space 16. The insulating and sealing device 22 has an open topped trough 24 fabricated of a resilient, flexible material such as a sheet of plastic, urethane, polyethylene, and polystyrene, or a metallic foil such as aluminum, or a plastic material faced with a metallic foil. The trough 24 of the insulating and sealing device 22 is filled with a flexible, resilient thermal insulating material 26 such as either an opened cell or a closed cell foamed material, for example, urethane, or polyethylene or a fibrous material such as mineral wool, or fiberglass. The insulating material 26 is exposed at the open top of the trough 24. The side walls 28 of the trough 24 are spaced apart and converge or taper toward each other in a downward direction from the open top of the trough 24. As shown, the trough 24 is generally wedge shaped in transverse cross-section. Further, the width of the insulating and sealing device 22 across the open top of the trough 24 is at least as wide as is the width of the space 16 and preferably has a radial width greater than the radial width of the annular space 16 such that the insulating and sealing device 22 is radially compressed between the exterior wall surface of the inner water tank 12 and the interior wall surface of the outer shell 14 so that it is in compressed sealing contact between and with the interior wall surface of the outer shell 16 and in sealing contact with the exterior wall surface of the water tank 12. The portion of the annular space 16 above the insulating and sealing device 22 is filled with expanded thermal insulation material 30 such as urethane, polyethylene, polystyrene and the like, which functions as a thermal insulation surrounding the inner water tank 12. The insulating and sealing device 22 resists the pressure generated by the expanding foaming material 30 and prevents leakage past the insulating and sealing device 22 between the interface of the insulating and sealing device 22 and interior wall surface of the outer shell 14 and between the interface of the insulating and sealing device 22 and exterior wall surface of the water tank 12 of the yet liquid foamable material 28 as it is being injected into the annular space 16 and is in the process of foaming. It is speculated that the force of the expanding foam 30 would act on the insulation material 26 in the insulating and sealing device 22 exposed at the open top of the trough 24 to deform the insulating material 26 radially of the space 16 forcing it and the trough side walls 26 into even more tight sealing contact with the inner water tank 12 and the outer shell 14.

The portion of the annular space 16 beneath the collar 22 can be filled with a fiberous insulation 32.

Figure 2:
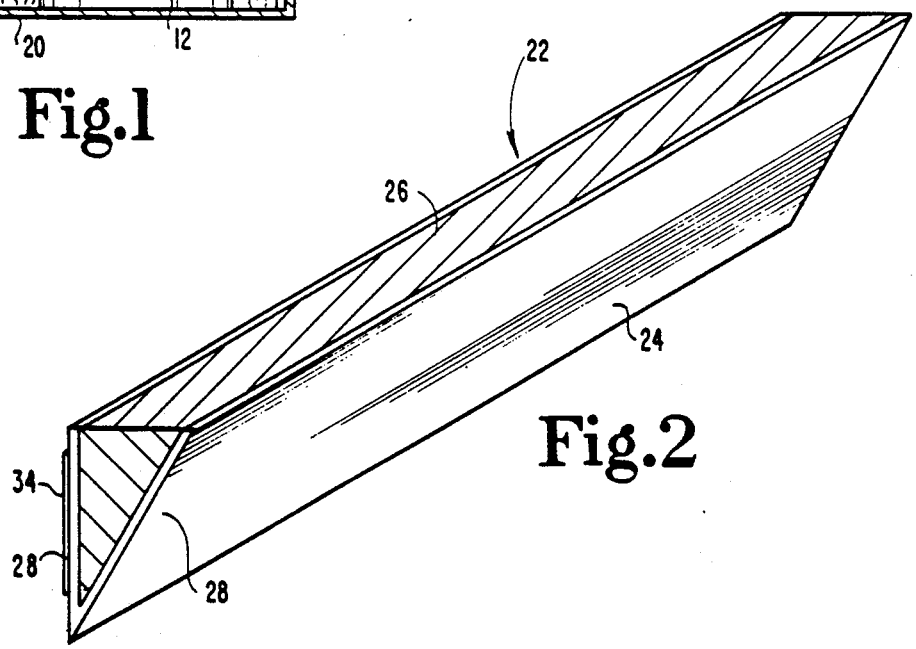
FIG. 2 is an enlarged perspective view of one embodiment of an insulating and sealing device of the present invention.

With reference to FIG. 2, the insulating and sealing device 22 can be fabricated as an elongated strip to be circumferentially wrapped around the exterior wall surface of the water tank 12 or circumferentially wrapped over the interior wall surface of the outer shell 14 as will hereinafter be discussed.

With reference to FIGS. 3 and 4, the insulating and sealing device 22 can be fabricated in the shape of a toroid having an inside opening for receiving the water tank 12 therethrough and an outside circumference for fitting circumferential at the interior wall surface of the outer shell 14 as will hereinafter be discussed.

Figure 8:
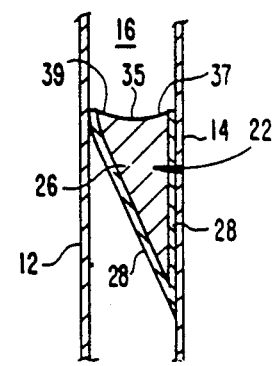
FIG. 8 is a transverse cross-sectional view of an insulation and sealing device installed in a space between two spaced apart walls of an appliance; and, FIGS. 9A and 9B are schematic representations, in transverse cross-section, of a refrigerator appliance construction of the present invention.

With reference to FIG. 6, the water heater construction 10 shown in FIG. 1 can be assembled by firstly positioning the insulating and sealing device 22 circumferentially around the exterior wall surface of the inner water tank 12 at a preselected location therealong. If the strip insulating and sealing device 22 of FIG. 2 is used, it is circumferentially wrapped around the water tank 12 and its opposite ends are placed in mutual abutment. The opposite ends thereof can be fastened together by, for example, a tape or other adhesive. If the toroidal insulating and sealing device 22 of FIG. 3 is used, it can be slid downwardly over the water tank 12. In either case, it is also contemplated that the insulating and sealing device 22 can be attached to the exterior wall surface of the water tank 12 by means of, for example, an adhesive 34 at the interface of the insulating and sealing device 22 and exterior wall surface of the water tank 12. As shown in FIGS. 1 and 6, the insulating and sealing device 22 is located between the top end and bottom end of the water tank 12, but it should be understood that it can be located any where along the water tank 12, for example, at the bottom end of the water tank. Next, the water tank is located at the top end of and coaxial with the outer shell 14 and is moved coaxially downwardly or in the direction of the taper of the insulating and insulating device 22 into the outer shell 14 the full length of the outer shell 14. The downwardly facing taper of the insulating and sealing device 22 functions as a lead past the top edge of the outer shell 14 into the space 16 being defined as the tank 12 is moved into the outer shell 14. The insulating and sealing device 22 is then radially compressed between the outer shell 14 and inner water tank 12 in the annular space 16. Next, expandable foam insulation material 30 is placed in the annular space 16 above the annular insulating and sealing device 22 and is allowed to expand insitu filling the annular space 16 above the annular insulating and sealing device 22. FIG. 8 illustrates a cross-sectional view of the insulating and sealing device 22 greater in width across its open top than the radial width of the space 16 as it would appear when installed across the space 16. The insulation material 26 in the trough 24 of the insulating and sealing device 22 will be distorted to form a concave top exposed surface 35 defining spaced apart annular lips 37 and 39. The expanding foam 30 exerts a force against the exposed concave surface 35 of the insulation material 26 in the trough 24 of the insulating and sealing device 22 further displacing and forcing the annular lip 37 of the insulation material 26 tightly against the interior wall surface of the outer shell 14 and the annular lip 39 of the insulation material 26 against the exterior wall surface of the water tank 12 increasing the sealing force at the interface of the insulating and sealing device collar 22 with the interior surface of the outer shell 14 and exterior wall surface of the water tank 12.

With reference to FIG. 7, the water heater construction 10 shown in FIG. 1 can be assembled by first positioning the insulating and sealing device 22 around the interior wall surface of the outer shell 14 in circumferential contact with the interior wall surface of the outer shell 14 at a preselected location therealong. If the strip insulating and sealing device 22 of FIG. 2 is used, it is circumferentially wrapped over the interior wall surface of the outer shell 14 and its opposite ends are placed in mutual abutment. The opposite ends thereof can be fastened together by, for example, a tape or other adhesive. If the toroidal insulating and sealing device 22 of FIG. 3 is used, it can be slid downwardly into the outer shell 14. In either case, it is contemplated that the insulating and sealing device 22 can be attached to the interior wall surface of the outer shell 14 by means of, for example, an adhesive 34 at the interface of the insulating and sealing device 22 and interior wall surface of the outer shell 14. As shown, the insulating and sealing 22 is located between the top end and bottom end of the shell 14, but it can be located at the bottom end of the shell 14. Next, the outer shell 14 is located at the top end of and coaxial with water tank 12 and is moved downwardly or in the direction of the taper of the insulational sealing device 22 coaxially over the full length of the water tank 12. The downwardly facing taper of the insulating and sealing device 22 functions as a lead past the top of the water tank 12 into the space 16 being defined as the outer shell 14 is moved over the water tank 12.

With insulating and sealing device 22 in place in the annular space 16 radially compressed between the outer shell 14 and inner water tank 12, expandable foam material 30 is placed in the annular space 16 above the annular insulating and sealing device 22 and is allowed to expand insitu filling the annular space 16 above the annular insulating and sealing device 22. The expanding foam 30 exerts a force against the exposed insulation material 26 in the trough 24 of the insulating and sealing device 22 displacing and forcing the insulation material 26 radially of the annular space 16 tightly against the interior wall surface of the outer shell 14 and against the exterior wall surface of the water tank 12 increasing the sealing force at the interface of the insulating and sealing device 22 and interior surface of the outer shell 14, and the exterior wall surface of the water tank 12.

Alternatively, the water heater construction 10 shown in FIG. 1 can be assembled by first positioning the water tank 12 into concentric spaced apart relationship inside the outer shell 14 to define the annular space 16 therebetween. Next, the insulation and sealing device 22 can be positioned over the top end of the annular space 16 with the taper formed by the converging side walls of the insulation and sealing device 22 pointing downwardly toward the annular space 16. The insulation and sealing device 22 is moved downwardly in the direction of its tapered converging side walls into the annular space 16 between the water tank 12 and outer shell 14 such that it is in sealing contact with both the exterior wall surface of the water tank 12 and interior wall surface of the outer shell 14 across the annular space 16. Afterward, foamable insulation material 30 can be deposited in the annular space 16 above the insulation and sealing device 22 and allowed to foam in situ.

This tapered lead of the insulation and sealing device 22 discussed above provides for the compressive fit of the insulation and sealing device 22 in the annular space 16 required to withstand the forces generated by the foaming material 30, and at the same time provides ease of assembly of the outer shell 14 concentrically over the water tank 12 without crimping of the insulation and sealing device 22 and without the necessity of using a shoehorn type of tool to fit the insulation and sealing device 22 into the annular space 16.

A particular feature of the insulating and sealing device 22 when the insulation material 26 in the trough 24 is either an open celled foam material or a fibrous insulation is that the foaming insulation 30 above the insulation and sealing device 22 will penetrate the open pores or interstices of the insulation material 26 in the trough 24 thereby saturating the insulation material 26 further increasing the surface area of the insulating and sealing device 22 which contacts the interior wall surface of the outer shell 14 and exterior wall surface of the water tank 12 because the body of the insulation material 26 will bulge outwardly.

With reference once again to FIG. 4, it can be seen that the insulation material 26 in the trough 24 fills the trough to approximately the top edges of the converging side walls 28 of the trough 24.

Figure 5:
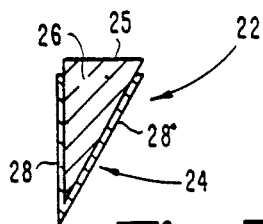
FIG. 5 is a transverse cross-section of another embodiment of an insulating and sealing device otherwise similar to the embodiment of FIGS. 2 and 3.

Referring to FIG. 5, there is shown, in transverse cross-section, the trough 24 having the insulation material 26 overfilling the trough 24 so that it extends above the top edges of the converging side walls 28 of the trough 24. It has been determined that, in some installations, the material of the trough side wall 28 defining the inside circumference of the insulating and sealing device 22 installed in the space 16 may wrinkle or pucker, and that by overfilling the trough 24, the wrinkling of the inside circumferential trough wall is eliminated, or at least diminished.

Figure 9A:
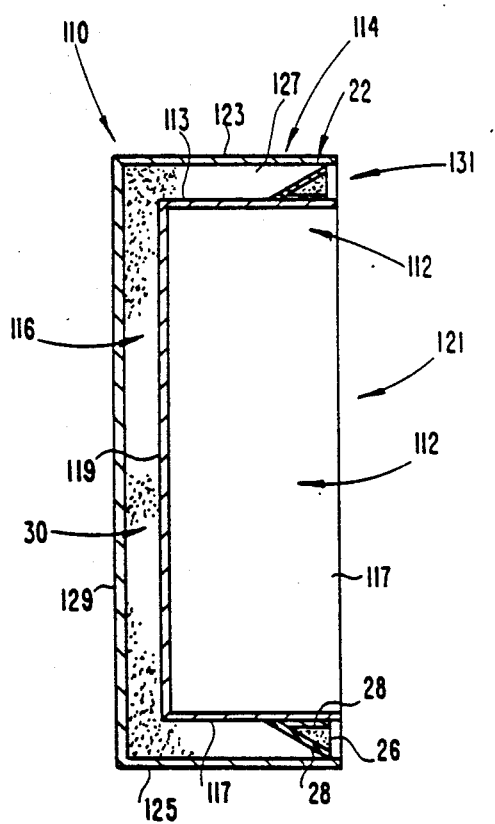
Figure 9B:
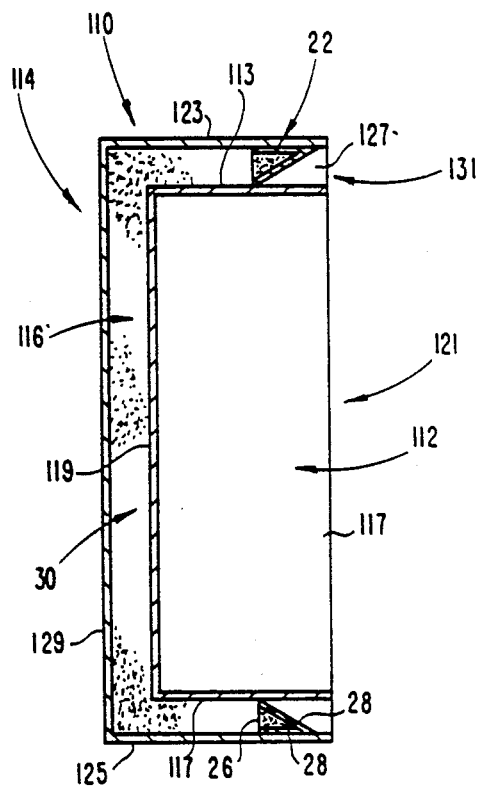

FIGS. 9A and 9B each schematically illustrate, in transverse cross-section, a typical refrigerator appliance, generally denoted as the numeral 110. The refrigerator 110 comprises an inner refrigerated compartment 112 for containing food to be preserved which has a top wall 113, a bottom wall 115, two spaced apart side walls 117, a back wall 119, and an open front side 121 opposite the back wall 119. A door, not shown, closes the open front side 121. An outer shell 114 has a top wall 123, a bottom wall 125, two spaced apart side walls 127, a back wall 129, and an open front side 131 opposite the back wall 129. The inner refrigerated compartment 112 is received within the outer shell 114 with a space 116 defined between the walls 113, 115, 117, 119, of the refrigerated compartment 112 and the overlaying corresponding walls 123, 125, 127, 129, of the outer shell 114. The insulating and sealing device 22 is located in the space 116 in compression between the walls 113, 115, 117 of the refrigerated compartment and overlaying corresponding walls 123, 125, 127 of the outer shell 114. As shown, the insulating and sealing device 22 is located proximate the open side of the space 116 defined between the refrigerated compartment walls 113, 115, 117, and the outer shell walls 123, 125, 127 at the open front 121 of the refrigerated compartment and the open front 131 of the outer shell 114. The portion of the space 116 behind the insulation and sealing device 22 can then be filled with the foamable insulation material 30 and allowed to foam in situ.

With reference to FIG. 9A, the refrigerator appliance 110 can be assembled by first positioning the insulation and sealing device 22 around outside perimeter of the refrigerated compartment 112 overlaying the exterior surface of the refrigerated compartment walls 113, 115, and 117 with the taper of the converging trough walls 28 directed toward the back wall 119. The insulation and sealing device 22 can be attached to the exterior surface of the compartment walls by, for example, an adhesive. Next, the refrigerated compartment 112 is moved concentrically into registration with the outer shell 114 in the direction of the taper of the insulation and sealing device 22. The space 116 behind the insulation and sealing device 22 is filled with foamable insulation material 30 which is allowed to expand in situ.

Alternative, with reference to FIG. 9B, the refrigerator appliance 110 can be assembled by first positioning the insulation and sealing device 22 around the interior perimeter of the outer shell 114 overlaying the interior surface of the outer shell walls 123, 125, and 127 with the taper of the converging trough walls 28 directed toward the open front side 131 of the outer shell 114. The insulation and sealing device 22 can be attached to the interior surface of the outer shell walls by, for example, adhesive. Next, the outer shell 114 is moved concentrically over and in registration with the refrigerated compartment 112 in the direction of the taper of the insulation and sealing device 22. The space 116 behind the insulation and sealing device 22 is filled with foamable insulation material 30 which is allowed to expand in situ.

With reference once again to FIG. 9A, alternatively, the refrigerator appliance 110 can be assembled by first positioning the inner refrigerated compartment 112 into concentric registered relationship with the outer shell 114 with a space 116 therebetween. Next, the insulation and sealing device 22 is moved in the direction of its tapered side walls 28 through the opening into the space 116 at the registered open front side 121 of the comaprtment 112 and open front side 131 of the outer shell 114. The space 116 behind the insulation and sealing device 22 is filled with foamable insulation material 30 which is allowed to expand in situ.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A method of assembling an appliance having a first wall surface spaced from a second wall surface defining a space therebetween comprising the steps of:
    providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;
    positioning the insulation and sealing device in contact with the first wall of said appliance; and
    moving the first wall of said appliance in the direction of taper to a position overlaying the second wall in spaced apart juxtaposition with the second wall such that the insulation and sealing device is in contact with the second wall creating a seal across the space.

2. The method of claim 1 comprising the further steps of filling the space between the first and second walls of said appliance to the opposite end of said insulation and sealing device with a foamable insulation material, and allowing the foamable insulation material to form in situ.

3. A method of assembling an appliance having a first wall spaced from a second wall defining a space therebetween comprising the steps of:
    providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;
    positioning the first and second walls of said appliance into mutual spaced apart overlaying relationship to each other; and
    moving the insulation and sealing device in the direction of taper into the space between the first and second walls of the appliance such that it is in sealing contact with both the first and second walls of the appliance across the space therebetween.

4. The method of claim 3 comprising the further steps of filling the space between the first and second walls of said appliance to the opposite end of said insulation and sealing device with a foamable insulation material and allowing the foamable insulation material to foam in situ.

5. A method of making a water heater construction having an inner water tank, an outer shell concentric with and spaced from the inner water tank defining an annular space therebetween comprising the steps of:
    providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;

positioning the insulation and sealing device around and in contact with the interior wall surface of the outer shell and with the direction of taper of the insulation sealing device directed toward the bottom end of the outer shell;

positioning the water tank and outer shell in generally coaxial relationship with the bottom end of the outer shell in juxtaposition with the top end of water tank; and moving the water tank and outer shell into concentric relationship with each other such that the insulation and sealing device is in contact with the exterior wall surface of the water tank creating a seal across the annular space.

6. The method of claim 5 comprising the step of attaching the insulation and sealing device to the interior wall surface of the outer shell prior to moving the water tank and outer shell into concentric relationship.

7. The method of claim 5 comprising the further steps of, after the step of moving the water tank and outer shell into concentric relationship, filling the annular space to the opposite end of said insulation and sealing device with a foamable insulation material, and allowing the foamable insulation material to foam in situ.

8. A method of making a water heater construction having an inner water tank, and an outer shell concentric with and spaced from the inner water tank defining an annular space therebetween comprising the steps of:
providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;

positioning the insulation and sealing device around and in contact with the exterior wall surface of the inner water tank and with the direction of taper of the insulation and sealing device directed toward the bottom edge of the water tank;

positioning the water tank and outer shell is generally coaxial relationship with the bottom end of the water tank in juxtaposition with the top end of the outer shell; and moving the water tank and outer shell into concentric relationship with each other such that the insulation and sealing device is in contact with the interior wall surface of the outer shell creating a seal across the annular space.

9. The method of claim 8 comprising the step of attaching the insulation and sealing device to the exterior wall surface of the water tank prior to moving the water tank and outer shell into concentric relationship.

10. The method of claim 8 comprising the further steps of, after the step of moving the water tank and outer shell into concentric relationship, filling the annular space to the opposite end of said insulation and sealing device with a foamable insulation material, and allowing the foamable material to foam in situ.

11. A method of making a water heater construction having an inner water tank, and an outer shell concentric with and spaced from the inner water tank defining an annular space therebetween comprising the steps of:
providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;

positioning the water tank and outer shell in generally concentric relationship; and moving said insulation and sealing device in the direction of taper into the annular space between the water tank and outer shell such that it is in sealing contact with both the exterior wall surface of the water tank and the interior surface of the outer shell across the annular space therebetween.

12. A method of assembling an appliance having a first wall surface spaced from a second wall surface defining a space therebetween comprising the steps of:
providing a wedge-shaped insulation and sealing device having a first end and a second opposite end including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the first and second walls of the appliance, and a resilient insulating material disposed within the trough formed by the converging walls of said insulation and sealing device;

positioning the insulation and sealing device in contact with the first wall of said appliance; and moving the second wall of said appliance in a direction which is opposite to the direction of taper to a position overlaying the second wall in spaced apart juxtaposition with the second wall such that the insulation and sealing device is in contact with the second wall creating a seal across the space.

13. A method of insulating a space between two spaced-apart surfaces which prior to final assembly are movable relative to each other, said method of insulating comprising the steps of:
providing a wedge-shaped insulation and sealing device having a first end and a second opposite end and including a pair of walls converging together at said first end and spaced apart at said opposite end, the direction of taper being from said opposite end to said first end, said pair of walls being fabricated of a flexible material, the width of spacing of said walls at said opposite end being at least approximately equal to the space between the two spaced-apart surfaces, and a resilient insulating material disposed within the trough formed by the converging walls of said insulation and sealing device;

positioning the insulation and sealing device in contact with one of said spaced-apart surfaces; and moving at least one of said two spaced-apart surfaces relative to the other into a position wherein said two spaced-apart surfaces are in spaced-apart juxtaposition and said insulation and sealing device creates a seal across said space.

* * * * *